Patented May 31, 1927.

1,631,062

UNITED STATES PATENT OFFICE.

GEORGE RIVAT, OF PATERSON, NEW JERSEY, ASSIGNOR, BY MESNE ASSIGNMENTS, TO LYONS PIECE DYE WORKS, OF PATERSON, NEW JERSEY, A CORPORATION OF NEW JERSEY.

WEIGHTED ARTIFICIAL SILK AND METHOD OF ITS PRODUCTION.

No Drawing. Application filed October 15, 1925. Serial No. 62,588.

Ordinary silk is weighted with tin by first treating it with a solution of tin chloride ($SnCl_4$), then washing the silk, treating with sodium phosphate, and, if desired, also with silicate of soda.

This process of tin-weighting, however, does not yield satisfactory results when applied, without modification, to artificial silk or artificial fibers made of acetate of cellulose. This material, which usually contains from 50% to 52% of acetic acid bound as an ester of cellulose, is practically impermeable to water, and therefore absorbs but a very small proportion of the tin solution and of the sodium phosphate solution. For instance with one type of acetate cellulose silk now on the market, the maximum gain in weight obtainable with the ordinary treatment is 2%. The impermeability of this special artificial silk, to aqueous solutions, also reduces its capacity to take up usual dyestuffs, in fact it is absolutely refractory to most dyestuffs.

The object of my present invention is to improve the weighting treatment to such an extent that artificial silk of the type set forth may take up a much higher percentage of the weighting agent (from thirty to more than fifty times the maximum obtainable hitherto).

In order to obtain these improved results, I bring the acetate of cellulose into a state of gel, that is to say, I modify its colloidal state so as to greatly increase its absorptive power. A gelling agent is a product which swells the cellulose acetate fibre and temporarily modifies its colloidal state by converting the cellulose acetate from a solid to a gel condition. When the fibre is in a gel state, it is particularly adapted to absorb other materials.

For the purposes of my present invention, cold aqueous solutions of formic acid or of acetic acid, in concentrations of from 15% to 20%, have been found very efficient as gelling agents, enabling the acetate of cellulose fibers to absorb readily not only basic dyestuffs, but the weighting agent (for example tin chloride) as well. The gelling agent is brought in contact with the fibers either before they are treated with the tin chloride solution (or other weighting agent such as a salt of any other heavy metal), or during the weighting treatment, or both before and during such treatment. When the gelling agent and the weighting agent are to act simultaneously, the addition, for example, of seventy-five cubic centimeters of acetic acid to one liter of the customary tin chloride solution will be a suitable proportion.

After passing through the tin chloride solution (tin bath), the acetate of cellulose is washed carefully with water, thereby hydrolyzing the tin completely on the fiber. After this washing no chlorine should be found on the fiber.

The acetate of cellulose is then gelled again by passing through a cold aqueous formic acid solution of a strength of from 15% to 20%, then washed with water, and subsequently passed through a warm sodium phosphate bath (at a temperature of from 40° to 45° centigrade), this sodium phosphate treatment being performed in the same manner as is customary in the case of weighting natural silk. This sodium phosphate bath is used for the purpose of fixing the tin. After the fixing (phosphating) treatment a further treatment with silicate of soda may be employed in some cases, if desired.

The treatment consisting of these steps of gelling, tin-weighting, washing, and fixing (phosphating) and if desired, treating with silicate of soda, may be repeated once or oftener to increase the amount of weighting agent absorbed. Very high weighting percentages may thus be obtained, for instance 75%, 100%, or even more.

Acetate of cellulose products, when weighted as described above, lose none of their desirable qualities. The artificial silk thus treated remains soft and lustrous and keeps all its original selective affinities for dyestuffs. In fact, these affinities are enhanced, and in particular the affinity for certain dyestuffs, such as the S. R. A. (sulfo ricinoleic acid dyestuffs), is increased very materially by the weighting treatment described.

I desire it to be understood that my invention is applicable to acetate of cellulose fibers or products irrespective of their condition, that is, whether they be in the nature of threads, skeins, fabrics, etc. Furthermore, these fibers may be treated either alone, or in conjunction with others, as for instance in the case of mixed woven fabrics which consist only partly of acetate of cellulose.

Various modifications may be made without departing from the nature of my invention as set forth in the appended claims.

What is claimed is:

1. The process which comprises treating cellulose acetate silk with a gelling agent and with a weighting agent.

2. The process which comprises treating cellulose acetate silk with a gelling agent and with a weighting agent comprising a suitable salt of a heavy metal.

3. The process which comprises treating cellulose acetate silk with a gelling agent and with a tin chloride weighting solution.

4. The process which comprises treating cellulose acetate silk with a gelling agent and with a tin chloride weighting solution, then washing the product thus treated, and then treating it with a suitable fixing agent.

5. The process which comprises treating cellulose acetate silk with a gelling agent and with a tin chloride weighting solution, then washing the product thus treated, then again treating with a gelling agent, and thereupon treating the product with a suitable fixing agent.

6. The process which comprises treating cellulose acetate silk with a gelling agent and with a weighting agent, washing the product thus treated, again treating with a gelling agent, and then treating the product with a fixing agent.

7. The process which comprises treating cellulose acetate silk with a gelling agent and with a solution of a weighting agent comprising a suitable salt of a heavy metal, then washing the product thus treated, and then treating it with a fixing agent.

8. The process which comprises treating cellulose acetate silk with a gelling agent and with a solution of a weighting agent comprising a suitable salt of a heavy metal, then washing the product thus treated, then again treating with a gelling agent, and thereupon treating the product with a fixing agent.

9. In the process of weighting cellulose acetate silk, the step which comprises treating the silk with a gelling agent.

10. In the process of weighting cellulose acetate silk, the step which comprising treating the silk with a solution of a water soluble aliphatic acid having a concentration of 15 to 20 per cent.

11. The process of weighting cellulose acetate silk which comprises treating the silk with a solution of a water soluble aliphatic acid and then subjecting the so treated silk to the usual weighting agents.

12. The process of weighting artificial silk which comprises treating cellulose acetate with a solution of a water soluble aliphatic acid having a concentration of not more than 20 per cent, and then subjecting the so treated silk to the action of a solution of tin chloride.

13. The process of weighting artificial silk which consists in treating cellulose acetate with a solution of a water soluble aliphatic acid having a concentration of 15 to 20 per cent, subjecting the so treated silk to the action of a solution of tin chloride, washing the silk with water and subsequently treating the silk with a warm solution of sodium phosphate.

In testimony whereof I have affixed my signature.

GEORGE RIVAT.